June 24, 1924.

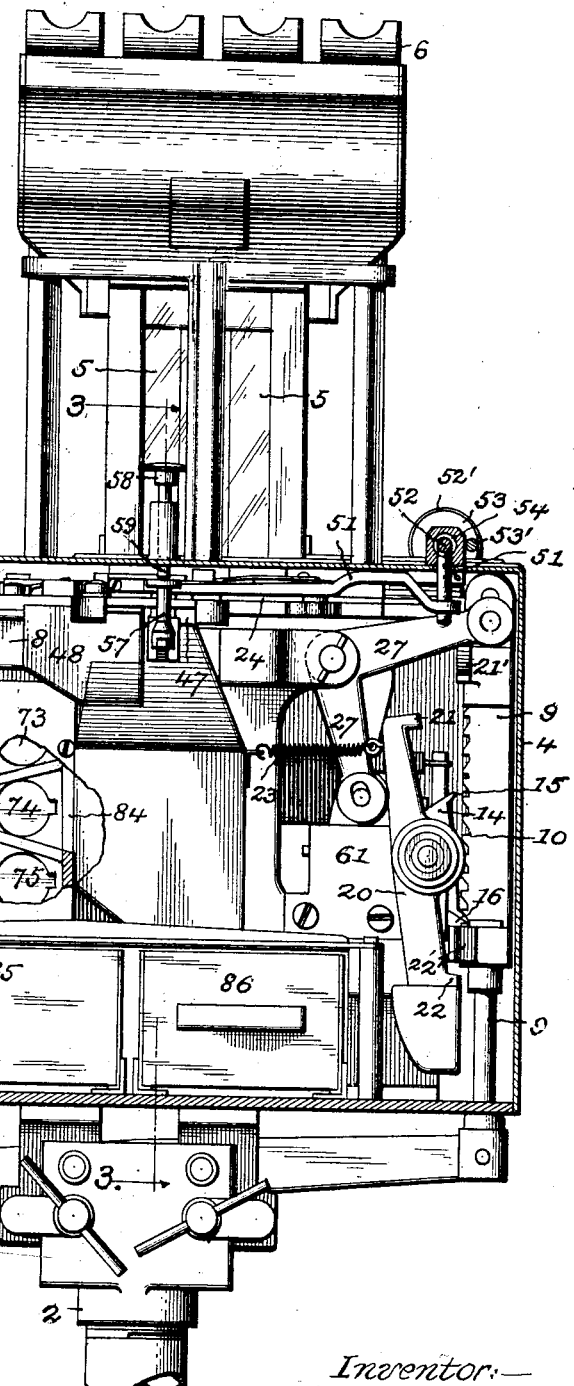

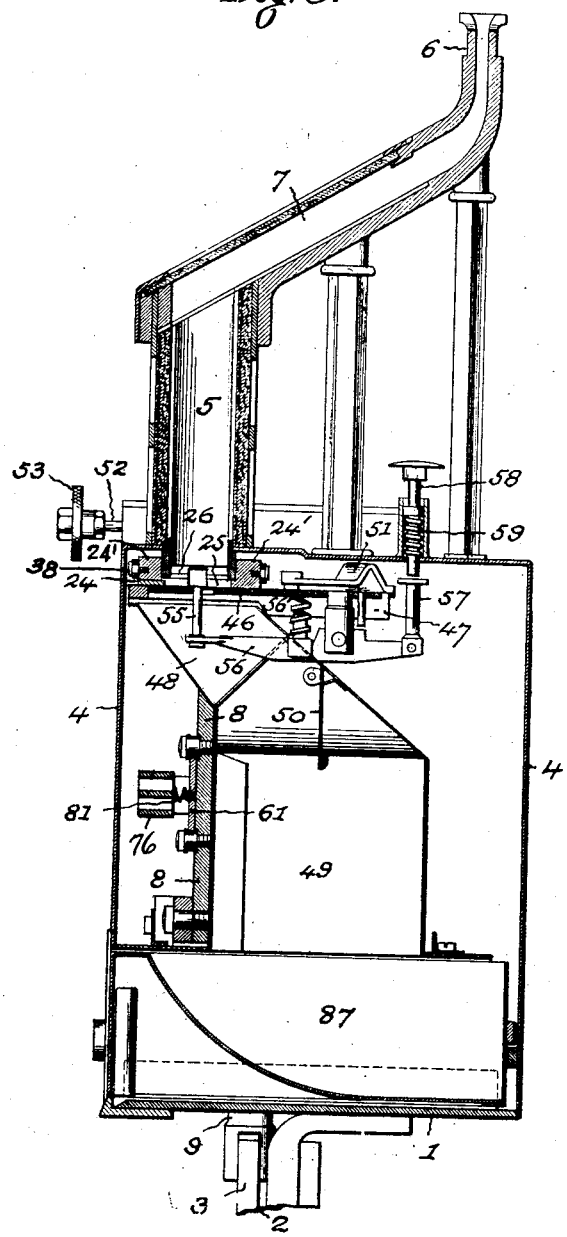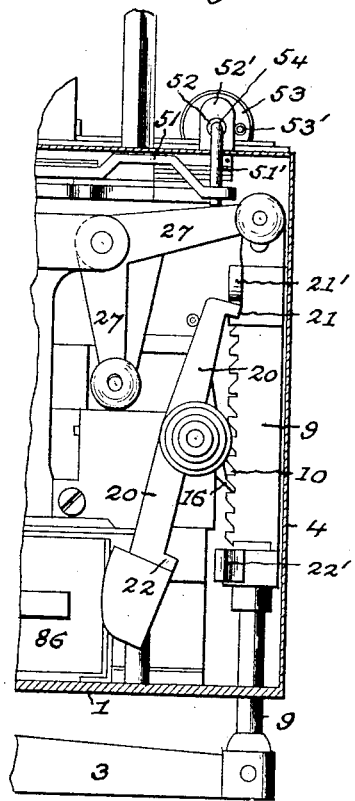

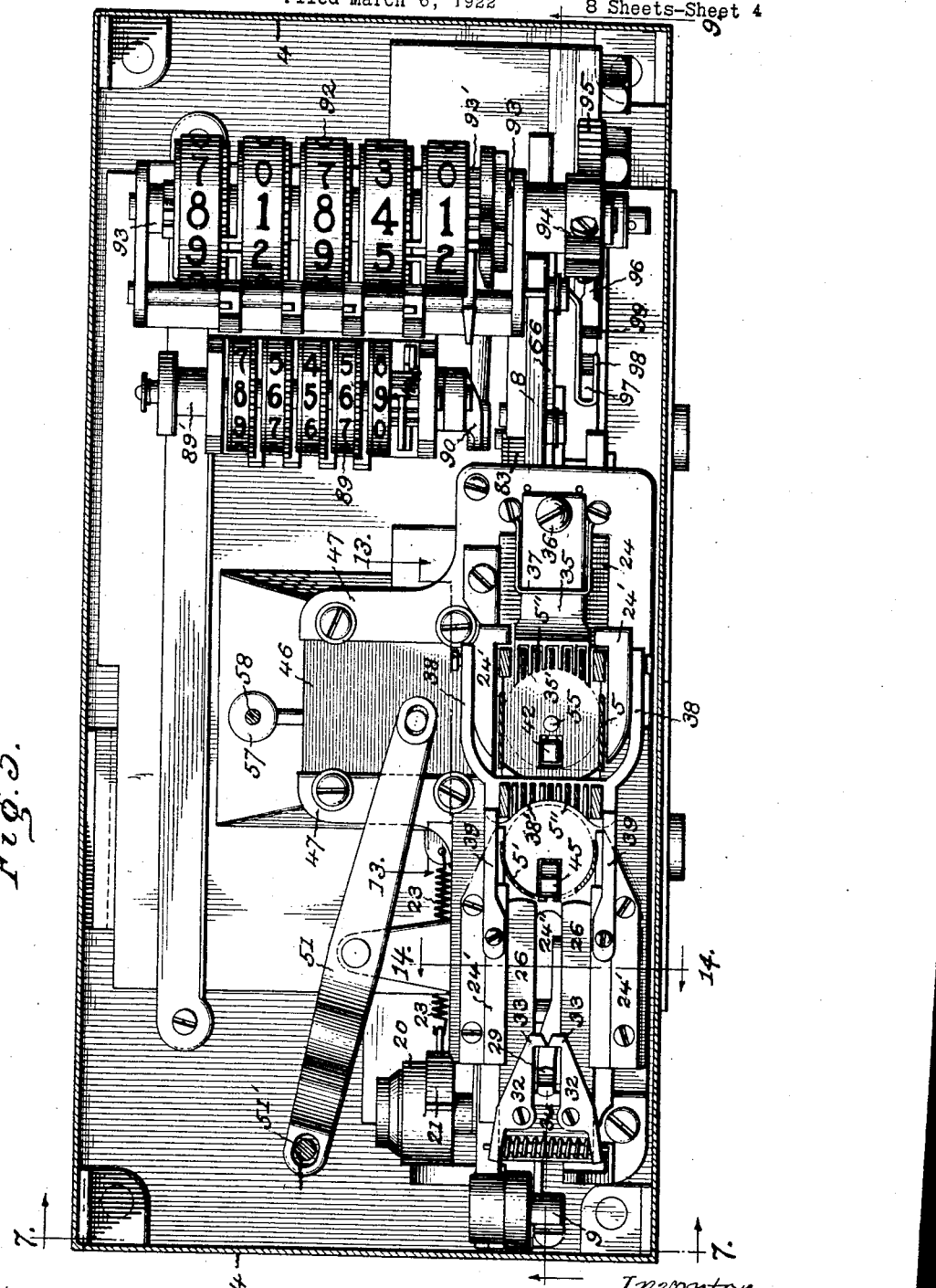

F. G. MURRAY 1,499,187

FARE BOX

Filed March 6, 1922

Witness.
Emil Cappelle

Inventor
Frank G. Murray
By Robert Burns Atty.

June 24, 1924.
F. G. MURRAY
1,499,187
FARE BOX
Filed March 6, 1922
8 Sheets-Sheet 6
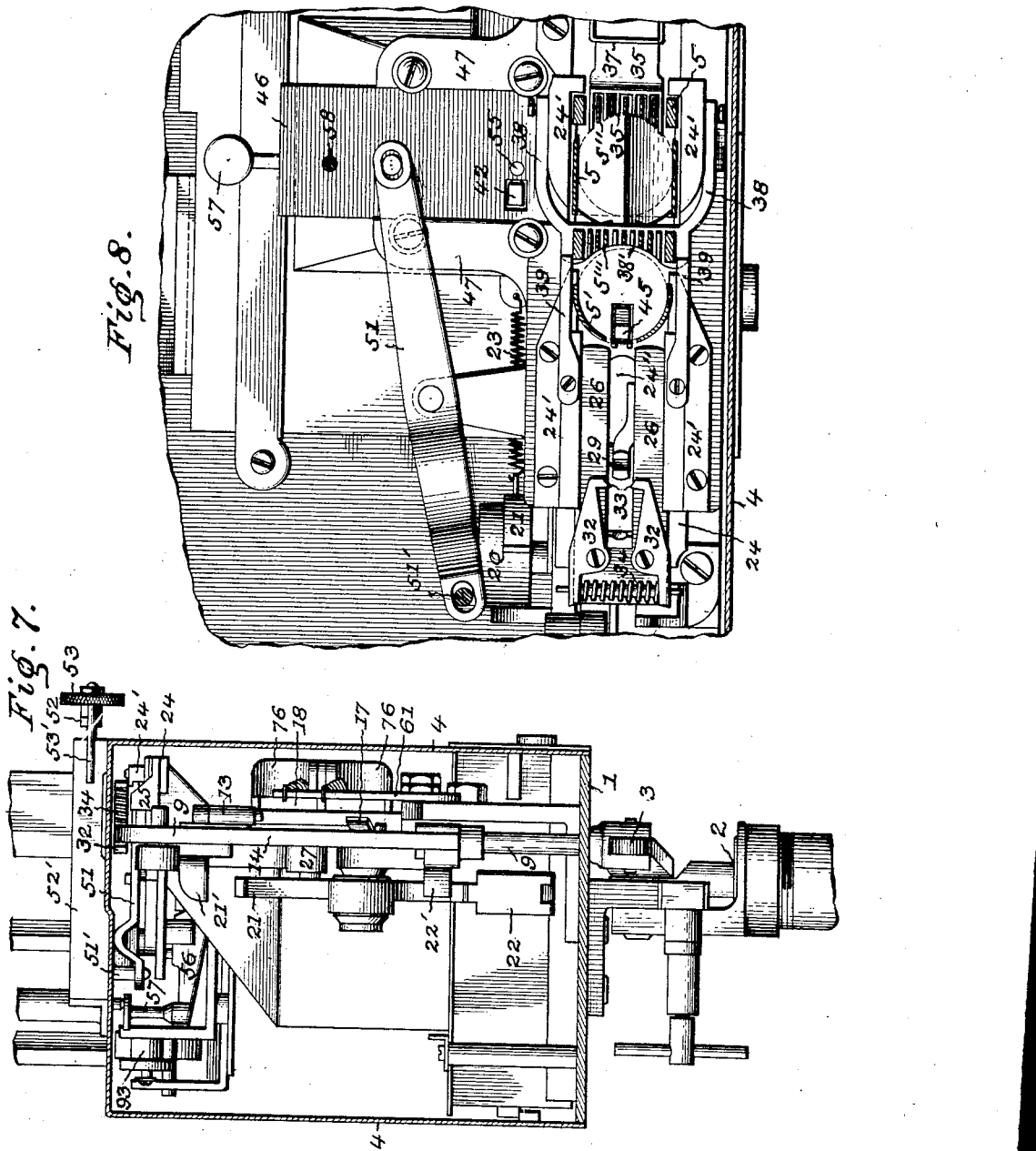

June 24, 1924.
F. G. MURRAY
1,499,187
FARE BOX
Filed March 6, 1922
8 Sheets-Sheet 7
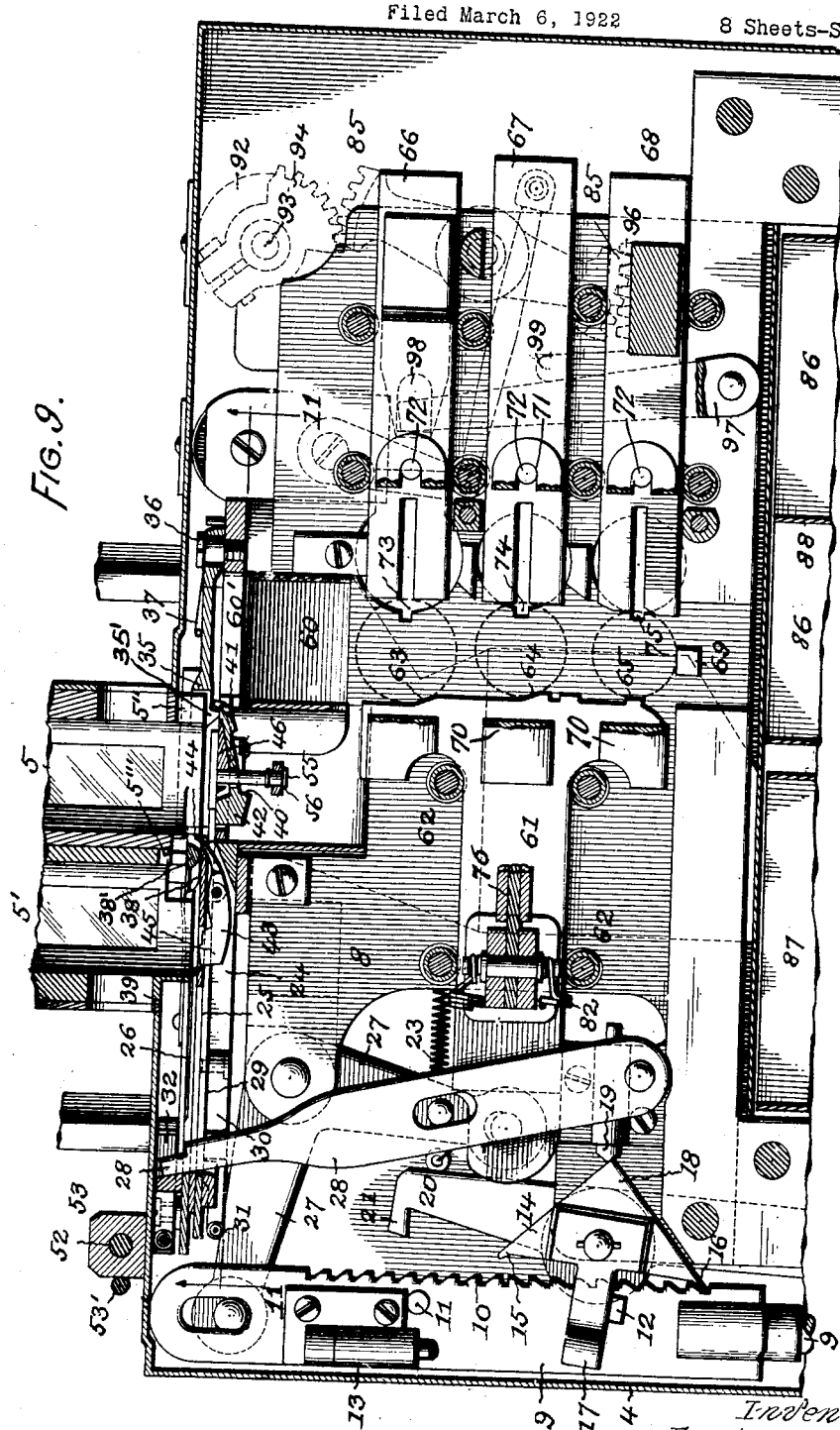

June 24, 1924.
F. G. MURRAY
FARE BOX
Filed March 6, 1922
1,499,187
8 Sheets-Sheet 8
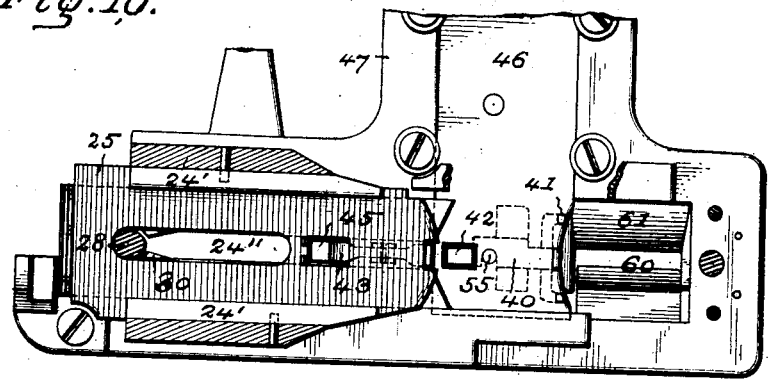
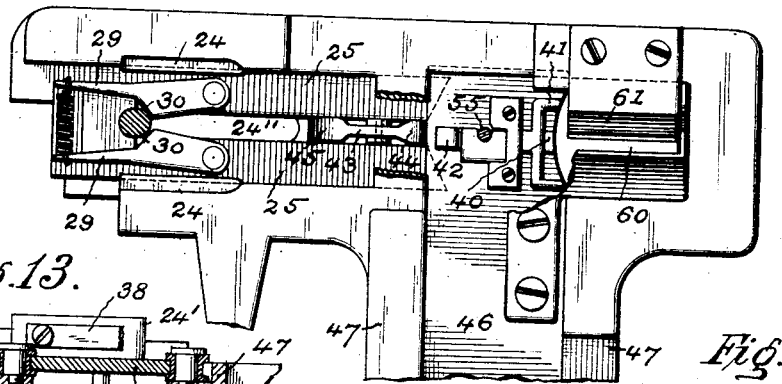
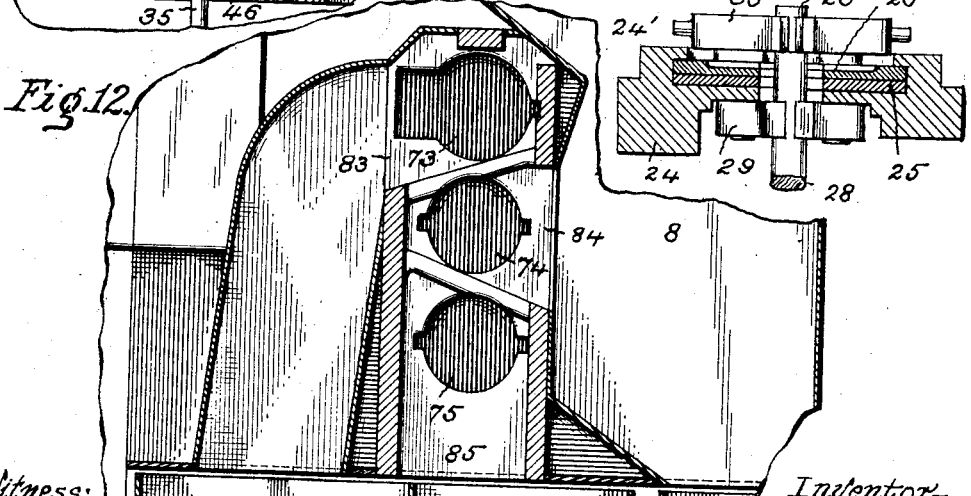
Witness:
Emil Coppell
Inventor
Frank G. Murray
By Robert Burns Atty.

Patented June 24, 1924.

1,499,187

UNITED STATES PATENT OFFICE.

FRANK G. MURRAY, OF CHICAGO, ILLINOIS.

FARE BOX.

Application filed March 6, 1922. Serial No. 541,332.

*To all whom it may concern:*

Be it known that I, FRANK G. MURRAY, a citizen of the United States of America, and a resident of Chicago, in the county of Cook and State of Illinois, have invented certain new and useful Improvements in Fare Boxes, of which the following is a specification.

This invention relates to that class of fare boxes and the like, in which the different coins or tokens are deposited in a receiving chamber from which they are serially fed to a selecting mechanism by which they are selected and discharged into individual receiving trays or compartments and the value of the coins or tokens registered at each operation of the apparatus. And the present improvement has for its objects:

To provide means for automatically locking the actuating mechanism when the same is operated at a speed which would either prevent a proper operation of the serial feeding and selecting mechanisms, or which would tend to clog up or damage the same.

To provide a structural formation and association of parts in the serial feeding mechanism, whereby the weight of the stack of coins or tokens in the receiving hopper is automatically removed from the feeding slide and coin or token being fed, during the shifting operation of said plate and coin or token.

To provide a safety connection between the feeding slide or plunger and its operating lever, adapted to release the operative connection between the parts upon an occurrence in the receiving hopper of an obstruction such as a coin or object larger in size than the particular sizes the apparatus is intended to handle.

To provide a structural formation and association of parts in the coin selecting or assorting mechanism of the apparatus, whereby the stroke or movement of the selector slides is attained in an accurate manner, and the liability to an excess movement of any particular slide due to acquired momentum of the same, with consequent over registry is prevented in a certain and effective manner.

To provide a structural formation and arrangement of parts of the receiving portion of the apparatus involving a multiplicity of receiving orifices and an inclined view chute or breast down which the coins or tokens slide into the receiving hopper or hoppers, without interference one with the other and a possible choking of the receiving hopper, and with which the inspection of the individual coins deposited is rendered easy and convenient.

To provide means whereby the release of the operating bar, so that the same may perform its up or return stroke, is automatically retarded, in order to allow proper time to the selecting mechanism to perform its final coin ejecting function.

To provide means for removing and conveying the contents of the receiving hopper into a locked receptacle in cases where the mechanisms of the apparatus is rendered inoperative by accident or design.

To provide in combination with the aforesaid receiving and feeding means, a manually actuated device for jolting the stack or mass of coins in the holding hopper and relieve a clogged condition of the coins in said hopper, all as will hereinafter more fully appear.

In the accompanying drawings:—

Fig. 2, is a rear elevation of the same with said enclosing housing shown in section and with other parts broken away and in section on line 2—2, Fig. 6.

Fig. 3, is a transverse section on line 3—3, Fig. 2.

Fig. 4, is a detail rear elevation of the automatic locking mechanism in an engaged position.

Fig. 5, is a horizontal section on line 5—5, Fig. 1.

Fig. 6, is a horizontal section on line 6—6, Fig. 1.

Fig. 7, is an end elevation, with the housing in section on line 7—7, Fig. 5.

Fig. 8, is a detail sectional plan view of the upper or secondary coin feeding bar and accessories in a position opposite to that shown in Fig. 5.

Fig. 9, is an enlarged longitudinal section on line 9—9.

Fig. 10, is a detail sectional plan view of the lower or primary coin feeding bar and accessories.

Fig. 11, is a detail inverted sectional plan view of the same, on line 11—11, Fig. 9.

Fig. 12, is a detail vertical section of the coin holding passage of the selecting mechanism on line 2—2, Fig. 6.

Fig. 13, is a detail vertical section on line 13—13, Fig. 5, of the dumping platform and accessories.

Fig. 14, is a detail transverse section on line 14—14, Fig. 5, of the primary and secondary feeding bars and their support.

Like reference numerals indicate like parts in the several views.

Figure 1:
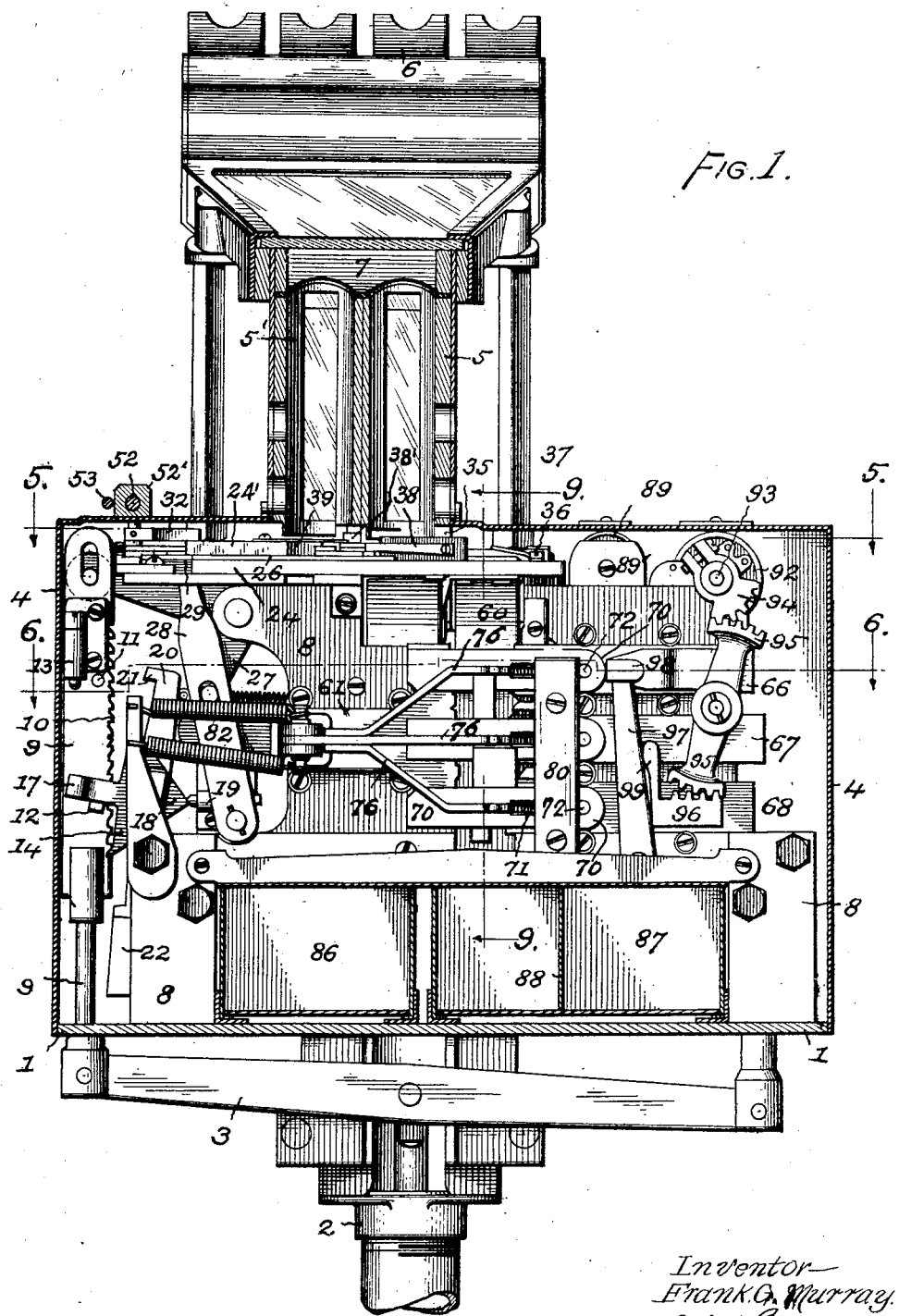
Fig. 1, is a front elevation of a fare box mechanism embodying the present improvements, the enclosing housing and receiving hoppers being shown in section.

The general arrangement of parts in the present improvement is substantially the same as in my prior Letters Patent No. 1,196,383, dated August 29, 1916, and as shown in the drawings comprises parts and arrangement thereof as follows:

1 designates the supporting base plate of the apparatus, mounted on a hollow pedestal 2, and affording on its under side pivotal support for a longitudinally extending operating lever 3, which may have operative connection through a connecting rod with a treadle mounted on the lower portion of the pedestal 2, as in my aforesaid patented construction, or by other usual and suitable actuating means.

4 designates an open bottom shell or housing, the lower edge of which is fitted to the aforesaid base plate 1, in a vertically detachable manner. Said shell 4, forms a protecting enclosure for the main mechanisms of the apparatus, and by its removal admits of a convenient access to said mechanisms for replacements and repairs.

5 designates a plurality of coin or token receiving hoppers, preferably two in number and comprising a primary hopper 5, and a supplementary hopper 5′. Said hoppers are secured at their lower ends to the top wall of the casing 4, near the forward edge of the said casing and opening into the interior of the same, and are of the usual transparent or view type and in the example shown consists of an inner section of glass tubing or like transparent material and an outer apertured protecting shell of metal.

6 designates an open top inlet neck of a longitudinally elongated form, provided with a plurality of individual inlet openings, preferably a multiple of the hoppers 5, for the deposit of the coin or token fares in the apparatus. Said inlet neck with its series of inlet openings are arranged longitudinally of the shell or housing 4, in a plane above and a distance to the rear of the hoppers 5, aforesaid.

7 designates an inclined intermediate chute connecting the lower end of the inlet neck 6, with the open tops of the hoppers 5, and is formed with a transparent top wall and with an inclined flat bottom wall down which the coins or tokens have a sliding movement in their passage into said hoppers. With the described arrangement of a greater plurality of inlet openings arranged longitudinally, a lesser plurality of receiving hoppers and an intermediate inclined chute, a very effective serial movement of the coins or tokens into the receiving hoppers is attained and the liability of two coins or tokens entering a hopper at the same time and becoming clogged therein is materially lessened without the necessity of moving parts or mechanisms to attain such result.

8 designates the main skeleton supporting frame for the different mechanisms of the apparatus, fixedly secured to the top of the base plate 1, and provided with guides or pivot bearings for the parts of such mechanisms as hereinafter set forth in detail.

9 designates a vertically reciprocating bar moving within the shell or casing 4, at one end of the supporting frame 8, and in the present construction constituting the primary operating means for the automatic mechanisms of the apparatus. At its lower end the bar 9 is operatively connected to the free end of the lever 3, aforesaid, and intermediate its length is associated with a pawl ratchet mechanism similar to that shown in my aforesaid Letters Patent, and by which a full stroke is imposed on the bar 9, in either direction, during the operation of the mechanism. Such mechanism consisting as follows:

10 designates a ratchet formation on an edge of the bar 9, and 11 and 12 designate upper and lower studs or pins on the side of said bar for operative engagement with the operating arm of the hereinafter described pawl.

13 designates a resilient buffer associated with the stud 11, and adapted to have initial contact with the above mentioned operating arm of the pawl, to reduce the impact on said arm and attain a slow reversal of position of said pawl in the down stroke of the bar 9.

14 designates a pawl member pivotally mounted on the supporting frame 8, and provided with upper and lower prongs or detents 15 and 16, for alternate engagement with the ratchet formation 10 of the bar 9, in the up and down stroke of the same.

17 designates an arm on one side of the pawl member 14, and arranged between and in the path of the upper and lower studs 11, 12, to be positively operated in one direction by one stud and in the other direction by the other stud.

18 designates an angular projection or heel on the side of the pawl member 14, opposite to the aforesaid arm 17, and having operative engagement with a resilient holding and operating means as follows:

19 designates a stud slidingly mounted in a guide housing on the main frame 8, and having a resilient movement against the angular heel 18 of the pawl member by means of a spring encircling said stud and enclosed in said housing. The forward or engaging end of the stud 19 is of a complementary V or double inclined shape to that of the aforesaid heel 18, and the operation of the described parts is as follows:

With the angular heel 18 in operating or sliding engagement with the lower inclined face of the stud 19, the lower detent 16 of the pawl member 14 will be resiliently held in engagement with the ratchet formation 10 of the operating bar 9, to prevent an upward retrograde movement of the same until it has made a full down stroke. In completing such full down stroke the upper stud 11 and buffer 13 of said bar engages the arm 17 of the pawl member to positively shift its angular heel 18 into operative sliding engagement with the upper inclined face of the stud 19, so that in the subsequent upward stroke of the operating bar 9, the same will be locked against downward retrograde movement by the upper detent 15 of the pawl member, until said bar 9 has completed its full up stroke and until by means of its lower stud 12, the pawl member has been returned to the position first above described.

A material feature of the present improvement in connection with the operating bar 9 of the mechanisms involves a safety means whereby undue and dangerous speed of operation is automatically prevented and a normal condition of the mechanisms restored on a cessation of the effort to attain such dangerous speed. In this:

20 designates a pendulum bar pivoted near its upper end on the main frame 8, and having at its upper end a lateral catch toe or prong 21, and near its lower and weighted end an offset face or projection 22, and said bar is yieldingly held in a normal inoperative position by a spring 23, as shown in Fig. 2. The lateral catch toe 21 is adapted for engagement beneath a lateral projection 21′ on the operating bar 9 to hold the same against operation under conditions hereinafter described, while the inclined face 22 is arranged in the path of a projection 22′ on the lower portion of the operating bar 9, which in a downward movement of said bar imparts a swinging movement to the pendulum bar 20, in a direction opposed to the stress of the spring 23. In a normal speed in the operation of the apparatus, the swinging movement of the pendulum bar is not sufficient to move the aforesaid prong 21 into locking engagement beneath the stop lug 21′ of the bar 9, when, however, the speed of operation of the bar 9 is increased to a dangerous degree, the high velocity of said bar in the impact of its projection 22′ against the offset 22 is sufficient to impart increased swing to the pendulum bar 20 to bring its lateral prong 21 into the path of the lateral projection 21′ to engage and lock said bar against further downward movement as shown in Fig. 4. With a cessation of the attempt at a dangerous speed in operation the pendulum bar 9 automatically disengages itself by gravity from the described safety position, to permit normal operation of the apparatus.

24 designates a track member or platform secured to the upper portion of the main frame 8, and extending longitudinally beneath and in adjacent relation to the open lower ends of the coin holding hoppers 5 and 5′ aforesaid, and adapted to support the stacks of coins or tokens that are to be serially separated.

In the particular construction shown in Figs. 1, 5, 9 and more particularly Fig. 14, the track or platform 24 consists of a main horizontal track plate or web 24 reinforced by a pair of downturned marginal flanges, and a pair of flanged rails 24′ arranged in spaced relation to each other on the upper surface of the track plate 24, to form confining guides for the primary and secondary coin feeding slides or plungers hereinafter described. The track plate 24 is also formed with an open longitudinal center 24″ for the movement of the operating lever etc. of the primary and secondary coin feeding slides above referred to, and with central orifices or passages for the movement of other moving parts of the associated mechanisms.

25, designates the lower and primary coin feeding slide or plunger moving longitudinally on the upper surface of the track plate 24, and in the lower portion of the guide channel formed by the side rails 24′ aforesaid. The feeding slide 25 is individual to the primary coin hopper 5, and is adapted to push the coins or tokens therefrom in a serial manner into the receiving throat of the hereinafter described selective mechanism. In the construction shown the slide 25 is formed with a central longitudinal gap extending to its engaging end, to permit the independent movement of its operating lever which occurs at time in the continued operation of the mechanism, as well as to afford clearance of the parts of the mechanisms which project up through the central part of the track plate 24 aforesaid.

26, designates the upper and supplementary coin feeding slide or plunger moving on the upper surface of the primary slide 25, and in the upper portion of the guide channel formed by the side rails 24′ aforesaid. The slide 26 is individual to the secondary coin hopper 5' and is adapted to the coins or tokens therefrom in a serial manner into the bottom of the primary hopper 5 and into the path of the primary slide 25, as hereinafter more fully set forth. Such feeding of the coins from the secondary to the primary hopper, only takes place when the stack of coins in the primary hopper have been serially fed to the selective mechanism. The side 26 is formed with a central longitudinal gap, similar to that in the slide 25 and for a like purpose.

27 designates a bell crank lever pivotally mounted on the main frame 8, and which in connection with a vertically arranged lever 28, also pivoted on the frame 8, constitutes the operative connection between the bar 9 aforesaid, and the separator plates or plungers 25, 26, above described. A material feature of the present improvement involves individual yielding connections between the vertical lever 27 and the plates or plungers 25, 26, so that when an obstruction, say for instance, a slug larger than any being handled, is accidentally or designedly inserted in the path of a plunger and causes a blocking of the same in its separating movement, the operative connection between such plunger and the lever 27 will be automatically released, permitting said lever and the other mechanisms to remain operative and continue their functions, the obstructed plunger and its immediate accessories only remaining inactive.

In the case of the secondary slide 26, the presence of a coin or token in the primary hopper 5, and in line with said secondary slide, will serve as an obstructive above described, to automatically prevent the feeding of coins from said secondary hopper 5' into the primary hopper 5, until all the coins in said primary hopper have been fed to the selective mechanism.

The means shown for attaining such safety results comprises a construction and arrangement of parts as follows:

29, 29, designate a pair of counterpart jaws pivoted to the lower side of the primary separating plate or plunger 25, at the respective sides of the heretofore described central gap in said slide, and in which gap the upper portion of the operating lever is adapted to have free movement at times.

30, 30, designate lateral projections or shoulders intermediate the length of the jaws 29 and extending towards each other to form yielding abutments for the operating end of the lever 28 aforesaid, and adapted to move apart and release such abutting engagement when too great a resistance is met with in an active stroke of the separating plate or plunger 25.

31 designates a tension spring connecting the free ends of the jaws 29 together and adapted to resiliently hold the lateral projections 30 of said jaws in operative engagement with the lever 28 under the resistance stress normally prevailing in the operation of the parts.

32, 32, designate a pair of counterpart jaws pivoted to the upper side of the supplementary separating plate or plunger 26 at the respective sides of the elongated slot in said plunger in which the adjacent end of the lever 28 has free movement.

33, 33, designate lateral hooks or projections at the free ends of the jaws 32, extending towards each other to provide yielding abutments for the operating end of the lever 28 aforesaid, and adapted, as in the similar construction above described, to move apart and release such abutting engagement when too great a resistance is met with in the active stroke of the separating plate or plunger 26.

34 designates a compression spring arranged between the opposite ends of the jaws 32, and adapted to resiliently maintain said jaws in operative engagement with the lever 28 under the normal resistance stress of the parts.

35 designates a guard member having a head portion 35' of a concave and slitted form to provide a series of prongs which intermesh with a corresponding set of stationary and depending prongs 5" of a grating formation at the lower right hand side of the primary hopper 5 aforesaid. In the preferred construction of parts, the head portion 35' of the guard member rests upon the central coin supporting web of the housing 24 aforesaid, and has its lower and forward edge beveled as shown in Fig. 9, so that it may be vertically displaced as an individual and lowermost coin or token is being moved by the separating plunger 25, from the hopper 5 into the receiving chute of the selecting mechanism hereinafter described.

The vertical lift of the beveled free end 35' of the guard member 35 is just sufficient to permit the longitudinal displacement of a single coin or token, the lowermost of the stack, beneath the guard member 35, while the intermeshing prong formations of the forward end of said guard member and lower end of the hopper 5 acts to hold the stack of coins in position within said hopper, with the square upper portion of said forward end of the guard member 35 providing a swinging abutment for the lowermost of the stack of coins, to assist in an easy upward movement of the stack by the rocker member 42, hereinafter described, in a continued operation of the machine.

36 is a headed stud fixed in the housing 24 aforesaid, with its shank portion adapted for engagement in an enlarged orifice in the end of the guard member 35 opposite to the head 35' thereof, and so that said guard member may be capable of the limited vertical movement above described.

37 designates a spring tending to yieldingly hold the guard member 35 in its above described normal position with relation to the central web of the housing 24 aforesaid.

38 designates a guard member associated with the supplementary hopper 5' and having an approximately counterpart formation to the guard member 35 above described, and comprising a head portion 38' of concave and slitted form to provide a series of prongs which intermesh with a corresponding set of stationary and depending prongs 5''' of a grating formation at the lower right hand side of the supplementary hopper 5' aforesaid. In the construction shown, the head portion 38' of the guard member rests upon the upper face of the track member 24 aforesaid, and has its lower and forward edge beveled as shown in Fig. 9, so that it may be vertically displaced as an individual and lowermost coin or token is being moved by the separating plunger 26, from the supplementary hopper 5' into the primary hopper 5 aforesaid. The body portion of the guard member 38 has the form of a yoke shape extension of the head 38' by which it is pivotally attached to the vertical extensions of the side rails 24' of the track member 24 at the respective sides of the primary hopper 5.

39 designates a spring tending to yieldingly hold the guard member 38 in its above described normal position with relation to the central web of the housing 24 aforesaid.

The normal vertical lift of the rounded forward end 38' of the guard member 38 is just sufficient to permit a longitudinal displacement of a single coin or token beneath the guard member, while the intermeshing prong formation of the end portion 38' and lower end 5'' of the hopper 5' act to hold the stack of coins in position in said movement for a free uplift by the rocker member 43 hereinafter described, in a continued operation of the mechanism.

40 designates a primary rocking member pivoted at its midlength by a suitable bearing formed therefor in the track member 24 aforesaid, and having at one end upturned heel 41, and at the other end an upturned toe 42, with said toe located centrally beneath the stack of coins or tokens in the primary hopper 5, and with said heel and toe moving in apertures formed therefor in the central part of the track member 24 aforesaid. In the normal and inactive position of the parts, the top surface of the toe 42 is on a level with the top surface of said track member, while the heel 41 extends up into the path of the lowermost coin or token in the hopper 5, so that in the removal of said coin from the hopper by the plunger 25, the heel 41 will be depressed by the passing coin or token and the toe 42 correspondingly raised to engage beneath and support the stack of coins or tokens in said hopper and relieve the plunger 25 and associated parts from undue frictional stress and weight and prevent clogging of the coins or tokens in said hopper or in the path of the plunger.

43 designates a supplementary rocking member pivoted at its mid-length beneath the track member 24 aforesaid, and having an operating heel 44 at one end and a supporting toe 45 at the other end, with said heel and toe adapted to operate in connection with the stack of coins or tokens in the supplementary hopper 5' in manner similar to the primary rocking member 40 above described, and have movement in apertures formed therefor in the track member 34.

46 designates a dumping plate or platform moving in transverse guides 47, with its forward portion on a plane with the central web of the track member 24 aforesaid, and in a normal position of the parts constituting a portion of said web and adapted to support the stack of coins or tokens in the primary hopper 5. With a lateral withdrawal of said plate or platform 46 from its normal position, and by means of manually actuated connections hereinafter described, a gap is left in the aforesaid track member 24, through which the stack of coins or tokens in the primary hopper 5 can be discharged into a chute 48 leading to a locked receptacle 49 in the lower part of the apparatus, when from accident or like contingency the contents of said hopper becomes clogged and it is desired to remove the clogged mass of coins or tokens therefrom and permit the reuse of the separating and selecting mechanisms after such removal. In the preferred form shown in the drawings, the primary rocking member 40 is pivotally mounted on the underside of the plate or platform 46 so as to move with the same and out of the path of the coins or tokens dumped in the manner above described.

50 designates a swinging baffle plate pivoted in the upper portion of the receptacle 49 adjacent to the chute 48, and adapted to close communication from said receptacle to said chute when a surreptitious attempt is made to abstract the contents by tilting the fare box upside down.

51 designates an operating lever pivoted at its mid-length to the main frame 8, with one end operatively connected to the dumping plate or platform 46, and with its other end provided with an orifice for detachable engagement with a downturned end or prong of an operating sliding member as follows:

52 designates a rod or spindle slidingly mounted in a transverse guide housing 52' fixed on the top wall of the enclosing housing 4 of the apparatus, and provided at its forward end with a rotatively mounted operating knob or handle 53, and at its rear end with a downturned prong or stud 51', above referred to, and which has detachable engagement in the end orifice of the operating lever 51, so that the rod or spindle 52 and its accessories may be removed along with the shell or housing 4 aforesaid.

53' designates a stop pin carried by the rotatable knob 53 in parallel relation to the guide housing 52' aforesaid, and adapted when the rod or spindle 52 is drawn to its full forward position, to be turned into stop engagement with the forward end of the housing 52' to lock said rod or spindle 52 in the described forward position and the dumping platform 46 in its retracted position.

54 designates a spring associated with the rod or spindle 52 and adapted to return and yieldingly hold the same in its rearward and normal position.

55 designates a jolting or agitating pin disposed centrally of the primary hopper 5 and carried on one end of a lever 56 pivoted on the underside of the aforesaid dumping plate or platform 46. The other end of said lever is provided with a headed post 57, which when the parts are in the operative position illustrated in Fig. 3, is immediately beneath manual operating means on the enclosing shell or housing 4 as follows:

56' designates a spring adapted to yieldingly maintain the lever 56, in a position in which the jolting pin 55 is in its lower position.

58 designates a vertically moving plunger mounted in the top wall of the shell or housing 4 and yieldingly held in a raised condition by an associated spring 59. At top the plunger 58 is provided with a thumb piece or head for manual operation, while its lower end is adapted to abut against the headed post 57 aforesaid, to transmit motion to the same and to the jolting pin 55 to jolt or agitate the mass of coins or tokens within the primary hopper of the apparatus.

60 designates the vertical receiving channel of the selecting or assorting mechanism of the apparatus, the front and rear walls of which are formed by plate portions of the main frame 8, while the end walls of said channel are formed mainly by the hereinafter described selective plates or plungers. The upper end or receiving throat 60' of said channel is arranged adjacent to the discharge end of the primary separating plunger 25, and has a flared or funnel form adapted to serially receive the horizontally discharged coins or tokens from said plunger and partly turn the same to a vertical condition in order to freely pass down in the receiving channel 60. In the construction shown, the receiving throat 60' is arranged beneath the primary guard member 35, see Fig. 9, so that the coins or tokens may be more effectively guided into said receiving throat.

61 designates the main selective slide or plunger of the selective mechanism of the fare box, preferably of a T form and slidingly associated with the main frame 8, by roller bearings 62, as shown. The slide or plunger 61 receives an intermittent and positive reciprocation from the operating bar 9 aforesaid, through the bell crank lever 27, which operates the primary and supplementary plungers 25, 26 heretofore described. The vertically elongated end portion of the slide or plunger 61 constitutes the end wall to the left of the coin or token receiving channel 60 aforesaid, and is formed with a vertical series of abutment or retaining shoulders 63, 64 and 65, adapted to cooperate with a corresponding construction of a plurality of companion slides as follows:

66, 67 and 68, designate a plurality of horizontal slides or plungers slidingly mounted in the main frame 8, in longitudinally aligned relation to the main slide or plunger 61 aforesaid. The ends of said slides which constitute the end wall to the right of the aforesaid receiving channel 60 are arranged in varied spaced relation to the opposed end of the main slide 61, with the upper slide 66 separated from the main slide 61 by a space adapted to permit a downward passage of one and ten-cent coins and to stop and retain a larger coin, say, a nickel five-cent coin. The middle slide 67 is separated from the main slide 61 by a space adapted to permit the downward passage of ten-cent coins and retain one-cent coins. And with the lower slide 68 separated from the main slide 61 by a space adapted to ten-cent coins, and with said coins held from further downward movement by a stop lug 69 on a side wall of the channel 60, as illustrated more particularly in Fig. 9. And in the preferred construction the middle and lower shoulders 64 and 65 of the main slide 61 are arranged on a vertical line, while the coin engaging face of the lower auxiliary slide 68 is set inwardly a distance corresponding to the difference in the diameter of coin destined for selective engagement with the slide 68 and that of the coin destined for selective engagement by the adjacent and superimposed auxiliary slide 67. With such specific arrangement of parts, a clear vertical way is provided for the smaller coins undergoing selection, and the liability of one of said coins of a ten-cent denomination being caught and registered by the selective means for the next larger coin of the one-cent denomination is reduced to a minimum.

The plurality of auxiliary slides 66, 67 and 68, are returned to and maintained in proper spaced relation to the main slide 61 after each cycle of operations of the mechanism by connections similar to those described in my aforesaid Letters Patent, and comprising as follows:

70 designates a series of longitudinal plate extensions fixedly secured to the main slide 61 and provided with elongated slots or channels 71 for intermittent operative engagement with the individual studs or pins 72 on the auxiliary slides 66, 67 and 68. With such construction all of the auxiliary slides are moved to and held in the normal set position above described by the main slide 61 as it completes its return movement to the left in the drawings. With an active movement of the main slide 61 to the right, the elongated slots 71 of its extensions 70 move upon the studs 72 of the auxiliary slides without operative engagement therewith. Owing to the fact that the presence of a coin or token is necessary as an intermediate operative means between the main slide 61 and either of the auxiliary slides 66, 67 or 68, in order to attain a movement of an auxiliary slide to the right, it follows that no movement to the right will be imparted to any of the auxiliary slides by the main slide 61, but the particular auxiliary slide which has a coin or token interposed between itself and the main slide 61.

73, 74 and 75, designate a plurality of outlet openings or passages formed in the rear wall plate of the receiving channel 60 aforesaid, and at a point to the right of said channel. Said openings are individual to and are normally closed by the plurality of auxiliary slides 66, 67 and 68 aforesaid, except when a coin or token is between the main slide 60 and one of the auxiliary slides, to effect a movement to the right of said auxiliary slide in unison with the main slide 61, leaving its individual outlet opening exposed with the coin or token in line with said opening and adapted to be discharged laterally into an individual receiving tray by an ejector mechanism as follows:

76 designates an ejector member pivoted on the face of the main slide 61 aforesaid, and having a plurality of longitudinally extending prongs or bars 77 formed with offset ends 78, which are disposed in transverse alignment with the respective openings 73, 74 and 75 aforesaid, and adapted to play into the same through longitudinal slits or passages formed in the auxiliary slides 66, 67 and 68, as shown in Figs. 6 and 9.

79 designate cam or inclined surfaces on the forward ends of the ejector prongs 77, adapted in an active movement to the right of the main slide 61 and ejector member 76, to have operative engagement with a vertical bridge piece 80 on the main frame 8, to impart a rearward swing to the ejector member and cause an offset end 78 to engage a coin or token, held in the path of said offset end by the aforesaid selector slides, and force said coin or token through a particular one of the plurality of outlet openings 73, 74 and 75, above described.

81 designates a spring tending to force the ejector member 76 in a forward direction away from the main frame 8 and into its normal position.

82 designates a spring attached at one end of the main frame 8, at the other end to the main slide 61 and adapted to pull said slide and its accessories into their normal position to the left.

83, 84 and 85, designate a series of diverging conducting chutes arranged to the rear of the selective mechanisms above described, and having at top individual communication with the series of outlet openings 73, 74 and 75, of said selective mechanisms, with the lower ends of said chutes adapted to discharge the coins or tokens into trays or containers as follows:

86 designates a sliding drawer or tray arranged in the lower portion of the main housing 4, and adapted to receive coins of the one-cent denomination from the intermediate chute 84 above described.

87 designates a companion and larger sliding drawer or tray arranged to one side of the drawer 86, and having a central transverse partition 88 forming separate receiving compartments which are adapted to receive in one case coins or tokens of the five-cent denomination from the chute 83, and in the other case, coins or tokens of the ten-cent denomination from the chute 85 aforesaid.

The associated registry mechanism of the fare box comprises an arrangement of parts as follows:

89 designates a registry mechanism of any usual type having a semi-rotary operating shaft 89' adapted in the present structure for intermittent actuation by the one-cent auxiliary selecting slide 67 by means of a ratchet arm 90 on said shaft and a connecting link 91 between said arm and said slide, as shown more particularly in Figs. 2 and 5.

92 designates a companion registry mechanism of any usual type having a semi-rotary operating shaft 93 operatively connected by the ordinary pawl and ratchet connection 93' with the tubular arbor of the primary indicating drum of said registry mechanism, and adapted in the present structure for intermittent actuation by the ten-cent and the five-cent coin or token auxiliary selecting slides 66 and 68, and by connections as follows:

94 designates a sector arm fixed on the shaft 93 and formed with gear teeth on its free end for operative engagement with a similar gear formation on the upper end of an intermediate rock arm 95 journalled in an upright position on the main frame 8.

96 designates a rack bar fixed on the lower auxiliary slide 68 aforesaid, with its gear teeth having operative engagement with a like gear formation on the lower end of the rock arm 95 aforesaid. With the described arrangement, the movement of the slide 68 by which the selection of coins or tokens of the ten-cent denomination is effected, is sufficient to effect a double unit registration on the registering mechanism 92, aforesaid.

97 designates an upright lever pivoted at its lower end on the main frame 8, and having operative connection at its upper end by a hook or strap 98 with the upper auxiliary slide 66, aforesaid.

99 designates an arm or tappet extending upwardly from the lower auxilary slide 68, and preferably formed as an integral part of the rack bar 96, as shown. The upper end of said arm or tappet is of a rounded form and is arranged in the path of the lever 97, to receive positive motion to the right from the same. The point of operative contact between the parts is midway the length of the lever 97, and is adapted to convert the full stroke of the slide 66, by which the selection of coins or tokens of the five-cent denomination is effected into one-half the stroke or movement that is imparted to the rock arm 95 by the slide 68 above described, and in consequence a single unit registry of the registry mechanism 92, is only attained by each movement of the slide 66, aforesaid.

The general operation of the apparatus is as follows:—

Coins or tokens serially entered through the inlet neck 6 gravitate into the primary hopper 5 and supplementary hopper 5' to become stacked therein. With the actuation of the pedal mechanism of the apparatus, the lower and primary coin feeding plunger 25 serially feeds the coins from the primary hopper 5 to the selecting and assorting mechanism of the apparatus, and such feeding of the coins from the primary hopper continues while there are any coins in the same. During such feeding of the coins from the primary hopper 5 by the primary plunger 25, the upper and supplementary feeding plunger 26, is inactive, in the manner heretofore described in connection with the detail construction of said plungers and their operating means.

With an empty condition of the primary hopper 5, the supplementary coin feeding plunger 26 begins active operation to serially feed the coins from the supplementary hopper 5' into the primary hopper 5, and coincident therewith the primary plunger 25 acts to serially feed such coins to the selecting and assorting mechanism of the appartus.

As the coins are serially fed by said primary plunger to said selecting and assorting mechanism the same will operate in unison with said feeding mechanism to grade the coins and discharge the same into containing chambers individual to the different denominations of the coins, as heretofore described in detail in connection with said mechanism.

When the pedal operating mechanism is operated so rapidly by the fare taker as to interefere with the proper operation of the feeding and assorting mechanisms, the heretofore described safety pendulum bar 20 and its associated parts automatically acts to prevent such over rapid operation, by a temporary stoppage of the pedal mechanism.

When by accident or intent, an object too large to pass through the guard devices associated with the primary coin feeding plunger 25, is inserted, the operator by a retraction of the dumping plate or platform 46, may form an opening in the track member 24 immediately beneath the primary coin hopper 5 and permit said obstruction, and any coins which may be above it, to drop into a locked receiver, after which with a return of the plate or platform 46, to its original position as part of the track 24, the apparatus is in condition for a resumption of its functions.

Having thus fully described my invention, what I claim as new and desire to secure by Letters Patent, is:—

1. In a selecting and registering fare box, the combination of a supporting frame, a receiving hopper, a selecting mechanism, a delivery slide arranged intermediate of said hopper and selecting mechanism, a reciprocating bar operatively connected to said slide and provided with a lateral stop lug and a side projection, and a pendulum bar having a lateral projection at its lower end arranged in the path of the side projection of the reciprocating bar and a catch lug at its upper end, adapted for holding engagement with the stop lug of said reciprocating bar.

2. In a selecting and registering fare box, the combination of a supporting frame, a receiving hopper, a selecting mechanism, a delivery slide arranged intermediate of said hopper and selecting mechanism, a reciprocating bar operatively connected to said slide and provided with a lateral stop lug and a side projection, a pendulum bar having a lateral projection at its lower end arranged in the path of the side projection of the reciprocating bar and a catch lug at its upper end adapted for holding engagement with the stop lug of said reciprocating bar and a spring tending to hold the lateral projection of the pendulum bar in the path of the side projection of the reciprocating bar.

3. In a selecting and registering fare box, the combination of a supporting frame, a receiving hopper, a selecting mechanism, a delivery slide arranged intermediate of said hopper and selecting mechanism, a reciprocating bar operatively connected to said slide and provided with a lateral stop lug and a side projection, an angle lever intermediate of said bar and the selecting mechanism, and a pendulum bar having a lateral projection at its lower end arranged in the path of the side projection of the reciprocating bar and a catch lug at its upper end adapted for holding engagement with the stop lug of said reciprocating bar.

4. In a selecting and registering fare box, the combination of a supporting frame, a receiving hopper, a selecting mechanism, a delivery slide arranged intermediate of said hopper and selecting mechanism, a reciprocating bar operatively connected to said slide and provided with a lateral stop lug and a side projection, an angle lever intermediate of said bar and the selecting mechanism, a pendulum bar having a lateral projection at its lower end arranged in the path of the side projection of the reciprocating bar and a catch lug at its upper end adapted for holding engagement with the stop lug of said reciprocating bar, a spring tending to hold the lateral projection of the pendulum bar in the path of the side projection of the reciprocating bar.

5. In a selecting and registering fare box, the combination of a supporting frame, a receiving hopper, a selecting mechanism, a delivery slide arranged intermediate of said hopper and selecting mechanism, a reciprocating bar operatively connected to said slide, and a momentum device operatively connected to the mechanism and adapted to lock the reciprocating bar when a predetermined speed of the same is exceeded.

6. In a selecting and registering fare box, the combination of a supporting frame, a receiving hopper, a selecting mechanism, a delivery slide arranged intermediate of said hopper and selecting mechanism, a rocking member pivoted to the supporting frame with one end arranged beneath the receiving hopper and a stack of coins therein, and the other end arranged beyond said hopper and in the path of coins as fed from said hopper.

7. In a selecting and registering fare box, the combination of a supporting frame, a receiving hopper, a selecting mechanism, a delivery slide arranged intermediate of said hopper and selecting mechanism, a reciprocating bar operatively connected to said selecting mechanism, a rocking member pivoted to the supporting frame and having an upturned toe at one end arranged beneath the receiving hopper and a stack of coins therein, and an upturned heel at the other end arranged beyond said hopper and in the path of the coins fed from said hopper.

8. In a selecting and registering fare box, the combination of a supporting frame, a receiving hopper, a delivery slide at the lower end of said hopper, a selecting mechanism in receiving relation to said slide, an operating means having a stem to engage said slide, and a yielding connection between said stem and slide, adapted to permit a full movement of the stem of the operating means when the slide meets an abnormal resistance.

9. In a selecting and registering fare box, the combination of a supporting frame, a receiving hopper, a delivery slide at the lower end of said hopper, a selecting mechanism in receiving relation to said slide, an operating means having a stem to engage said slide, and a yielding connection between said stem and slide comprising a spring held jaw adapted to move out of engagement with said stem when the slide meets with abnormal resistance.

10. In a selecting and registering fare box, the combination of a supporting frame, a receiving hopper, a delivery slide at the lower end of said hopper, a selecting mechanism in receiving relation to said slide, an operating means having a stem to engage said slide, and a yielding connection between said stem and slide comprising a pair of spring held jaws adapted to move out of engagement with said stem when the slide meets with abnormal resistance.

11. In a selecting and registering fare box, the combination of a supporting frame, a receiving hopper, a delivery slide at the lower end of said hopper, a selecting mechanism in receiving relation to said slide, an operating means having a stem to engage said slide, and a yielding connection between said stem and slide comprising a pair of opposed jaws pivoted on said slide and having hooks at their free ends, and a spring tending to hold said jaws in engagement with the stem aforesaid.

12. In a selecting and registering fare box, the combination of a supporting frame, a plurality of receiving hoppers, a plurality of delivery slides arranged in superimposed relation at the lower ends of said hoppers, a selective mechanism in receiving relation to said slides, and operating means having a stem adapted to engage said slides in common, and yielding connections between said stem and said slides adapted to pemit a full movement of the stem when either of said slides meet abnormal resistance.

13. In a selecting and registering fare box, the combination of a supporting frame, a plurality of receiving hoppers, a plurality of delivery slides arranged in superimposed relation at the lower ends of said hoppers, a selective mechanism in receiving relation to said slides, and operating means having a stem adapted to engage said slides in common, and yielding connections between said stem and said slides, each connection comprising a spring held jaw adapted to move out of engagement with the stem when slide meets with abnormal resistance.

14. In a selecting and registering fare box, the combination of a supporting frame, a plurality of receiving hoppers, a plurality of delivery slides arranged in superimposed relation at the lower ends of said hoppers, a selective mechanism in receiving relation to said slides, and operating means having a stem adapted to engage said slides in common, and yielding connections between said stem and said slides, each connection comprising a pair of spring held jaws adapted to move out of engagement with the stem when a slide meets an abnormal resistance.

15. In a selecting and registering fare box, the combination of a supporting frame, a plurality of receiving hoppers, a plurality of delivery slides arranged in superimposed relation at the lower ends of said hoppers, a selective mechanism in receiving relation to said slides, and operating means having a stem adapted to engage said slides in common, and yielding connections between said stem and said slides, each connection comprising a pair of opposed jaws pivoted on a slide and having hooks at their free ends and a spring tending to hold said jaws in engagement with said stem.

16. In a selecting and registering fare box, the combination of a supporting frame, a receiving hopper having a plurality of depending prongs at one side of its lower end, a delivery slide at the lower end of said hopper, a selecting mechanism in receiving relation to said slide, and a guard member having a rounded under corner at its forward end and a series of prongs adapted to intermesh with the aforesaid prongs of the hopper.

17. In a selecting and registering fare box, the combination of a supporting frame, a receiving hopper having a plurality of depending prongs at one side of its lower end, a delivery slide at the lower end of said hopper, a selecting mechanism in receiving relation to said slide, and a guard member pivoted at one end to the supporting frame and having a rounded under corner at its forward end and a series of prongs adapted to intermesh with the aforesaid prongs of the hopper.

18. In a selective and registering fare box, the combination of a supporting frame, a receiving hopper, a delivery slide at the lower end of said hopper, and a selective mechanism associated with said slide, the same comprising a main selective slide having positive reciprocation in unison with the aforesaid delivery slide, a plurality of companion slides aligned with the main slide and spaced therefrom to provide in connection with a front and rear wall on the supporting frame the end walls of a receiving passage for the coins, operative connections between the companion slides and the main slide permitting movement of the main slide independent of the companion slides in one direction and adapted to positively move the companion slides in the opposite direction into normal selective relation to said main slide, a rock bar intermediate of one of the companion slides and the operating shaft of a registering mechanism and forming a direct operating connection between said bar and shaft, and a lever connected at one end to another of the companion slides and having operative connection near its mid-length with the rock arm aforesaid, and adapted to impart reduced movement thereto.

19. In a selective and registering fare box, the combination of a supporting frame, a receiving hopper, a delivery slide at the lower end of said hopper, and a selective mechanism associated with said slide, the same comprising a main selective slide having positive reciprocation in unison with the aforesaid delivery slide, a plurality of companion slides aligned with the main slide and spaced therefrom to provide in connection with a front and rear wall on the supporting frame the end walls of a receiving passage for the coins, operative connections between the companion slides and the main slide permitting movement of the main slide independent of the companion slides in one direction and adapted to positively move the companion slides in the opposite direction into normal selective relation to said main slide, a toothed rack on one of said companion slides, a toothed sector on the primary shaft of a registering mechanism, a rock arm intermediate of said rack and sector with its ends formed for operative engagement with said parts, and a lever connected at one end to another of said companion slides and adapted for operative engagement at its mid-length with the aforesaid rock arm to impart reduced movement thereto.

20. In a selective and registering fare box, the combination of a supporting frame, a receiving hopper, a delivery slide at the lower end of said hopper, and a selective mechanism associated with said slide, the same comprising a main selective slide having positive reciprocation in unison with the aforesaid delivery slide, a plurality of companion slides aligned with the main slide and spaced therefrom to provide in connection with a front and rear wall on the supporting frame the end walls of a receiving passage for the coins, operative connections between the companion slides and the main slide permitting movement of the main slide independent of the companion slides in one direction and adapted to positively move the companion slides in the opposite direction into normal selective relation to said main slide, a toothed rack on one of said companion slides, a toothed sector on the primary shaft of a registering mechanism, a rock arm intermediate of said rack and sector with its ends formed for operative engagement with said parts, and a lever connected at one end to another of said companion slides and adapted for operative engagement at its mid-length with an upwardly extending arm of the toothed rack of the first mentioned companion slide.

21. In a selective and registering fare box, the combination of a supporting frame, a receiving hopper, a delivery slide at the lower end of said hopper, and a selective mechanism associated with said slide, the same comprising a main selective slide having positive reciprocation in unison with the aforesaid delivery slide, a plurality of companion slides aligned with the main slide and spaced therefrom to provide in connection with a front and rear wall on the supporting frame the end walls of a receiving passage for the coins, operative connections between the companion slides and the main slide permitting movement of the main slide independent of the companion slides in one direction and adapted to positively move the companion slides in the opposite direction into normal selective relation to said main slide, the supporting frame having coin outlet passages in lateral relation to the forward ends of the companion slides when the same are in their rearward position, an ejector bar pivoted on the main slide and having a plurality of rails formed with offset ends in line with said outlet passages of the supporting frame, said rails having inclined surfaces in adjacent relation to said offset ends, and a vertical bridge bar secured to the supporting frame and adapted to engage the inclined ends of said rails to move the ejector bar laterally in a movement of the main slide in a rearward direction.

22. In a selective and registering fare box, the combination of a supporting frame, a receiving hopper, a delivery slide at the lower end of said hopper, and a selective mechanism associated with said slide, the same comprising a main selective slide having positive reciprocation in unison with the aforesaid delivery slide, a plurality of companion slides aligned with the main slide and spaced therefrom to provide in connection with a front and rear wall on the supporting frame the end walls of a receiving passage for the coins, operative connections between the companion slides and the main slide permitting movement of the main slide independent of the companion slides in one direction and adapted to positively move the companion slides in the opposite direction into normal selective relation to said main slide, the supporting frame having coin outlet passages in lateral relation to the forward ends of the companion slides when the same are in their rearward position, an ejector bar pivoted on the main slide and having a plurality of rails formed with offset ends in line with said outlet passages of the supporting frame, said rails having inclined surfaces in adjacent relation to said offset ends, and a vertical bridge piece secured to the supporting frame and adapted to engage the inclined ends of said rails to move the ejector bar laterally in one direction in a movement of the main slide in a rearward direction, and a spring tending to move the ejector bar in an opposite direction and into its normal position.

23. In a selective and registering fare box, the combination of a supporting frame, a receiving hopper, a delivery slide at the lower end of said hopper, and a selective mechanism associated with said slide, the same comprising a main selective slide having positive reciprocation in unison with the aforesaid delivery slide, a plurality of companion slides aligned with the main slide and spaced therefrom to provide in connection with a front and rear wall on the supporting frame the end walls of a receiving passage for the coins, operative connections between the companion slides and the main slide permitting movement of the main slide independent of the companion slides in one direction and adapted to positively move the companion slides in the opposite direction into normal selective relation to said main slide, the coin engaging end faces of a plurality of the companion slides being in line with each other, and the coin engaging end of the main slide having a plurality of coin engaging shoulders arranged out of line with each other, and means associated with the main slide for ejecting laterally a coin from between the slides as the same nears the end of a rearward movement, the supporting frame having outlet openings adjacent to said companion slides for lateral movement of the coins in an ejecting operation.

24. In a selective and registering fare box, the combination of a supporting frame, a receiving hopper, a delivery slide at the lower end of said hopper, and a selective mechanism associated with said slide, the same comprising a main selective slide having positive reciprocation in unison with the aforesaid delivery slide, a plurality of companion slides aligned with the main slide and spaced therefrom to provide in connection with a front and rear wall on the supporting frame the end walls of a receiving passage for the coins, the main slide having a T head of a width equal to the plurality of companion slides and common thereto, operative connections between the companion slides and the main slide permitting movement of the main slide independent of the companion slides in one direction and adapted to positively move the companion slides in the opposite direction into normal selective relation to said main slide, a rock bar intermediate of one of the companion slides and the operating shaft of a registering mechanism, and a lever connected at one end to another of the companion slides and having operative connection near its mid-length with the rock arm aforesaid and adapted to impart reduced movement thereto.

25. In a selective and registering fare box, the combination of a supporting frame, a receiving hopper, a delivery slide at the lower end of said hopper, and a selective mechanism associated with said slide, the same comprising a main selective slide having positive reciprocation in unison with the aforesaid delivery slide, a plurality of companion slides aligned with the main slide and spaced therefrom to provide in connection with a front and rear wall on the supporting frame the end walls of a receiving passage for the coins, the main slide having a T head of a width equal to the plurality of companion slides and common thereto, operative connections between the companion slides and the main slide permitting movement of the main slide independent of the companion slides in one direction and adapted to positively move the companion slides in the opposite direction into normal selective relation to said main slide, a toothed rack on one of said companion slides, a toothed sector on the primary shaft of a registering mechanism, a rock arm intermediate of said rack and sector with its ends formed for operative engagement with said parts, and a lever connected at one end to another of said companion slides and adapted for operative engagement at its mid-length with the aforesaid rock arm to impart reduced movement thereto.

26. In a selective and registering fare box, the combination of a supporting frame, a receiving hopper, a delivery slide at the lower end of said hopper, and a selective mechanism associated with said slide, the same comprising a main selective slide having positive reciprocation in unison with the aforesaid delivery slide, a plurality of companion slides aligned with the main slide and spaced therefrom to provide in connection with a front and rear wall on the supporting frame the end walls of a receiving passage for the coins, the main slide having a T head of a width equal to the plurality of companion slides and common thereto, operative connections between the companion slides and the main slide permitting movement of the main slide independent of the companion slides in one direction and adapted to positively move the companion slides in the opposite direction into normal selective relation to said main slide, a toothed rack on one of said companion slides, a toothed sector on the primary shaft of a registering mechanism, a rock arm intermediate of said rack and sector with its ends formed for operative engagement with said parts, and a lever connected at one end to another of said companion slides and adapted for operative engagement at its mid-length with an upwardly extending arm of the toothed rack of the first mentioned companion slide.

27. In a selective and registering fare box, the combination of a supporting frame, a receiving hopper, a delivery slide at the lower end of said hopper, and a selective mechanism associated with said slide, the same comprising a main selective slide having positive reciprocation in unison with the aforesaid delivery slide, a plurality of companion slides aligned with the main slide and spaced therefrom to provide in connection with a front and rear wall on the supporting frame the end walls of a receiving passage for the coins, the main slide having a T head of a width equal to the plurality of companion slides and common thereto, operative connections between the companion slides and the main slide permitting movement of the main slide independent of the companion slides in one direction and adapted to positively move the companion slides in the opposite direction into normal selective relation to said main slide, the supporting frame having coin outlet passages in lateral relation to the forward ends of the companion slides when the same are in their rearward position, an ejector bar pivoted on the main slide and having a plurality of rails formed with offset ends in line with said outlet passage of the supporting frame, said rails having inclined surfaces in adjacent relation to said offset ends, and a vertical bridge bar secured to the supporting frame and adapted to engage the inclined ends of said rails to move the ejector bar laterally in a movement of the main slide in a rearward direction.

28. In a selective and registering fare box, the combination of a supporting frame, a receiving hopper, a delivery slide at the lower end of said hopper, and a selective mechanism associated with said slide, the same comprising a main selective slide having positive reciprocation in unison with the aforesaid delivery slide, a plurality of companion slides aligned with the main slide and spaced therefrom to provide in connection with a front and rear wall on the supporting frame the end walls of a receiving passage for the coins, the main slide having a T head of a width equal to the plurality of companion slides and common thereto, operative connections between the companion slides and the main slide permitting movement of the main slide independent of the companion slides in one direction and adapted to positively move the companion slides in the opposite direction into normal selecting relation to said main slide, the coin engaging end faces of a plurality of the companion slides being in line with each other and the coin engaging end of the main slide having a plurality of coin engaging shoulders arranged out of line with each other, and means associated with the main slide for ejecting laterally a coin from between the slides as the same nears the end of a rearward movement, the supporting frame having outlet openings adjacent to said companion slides for lateral movement of the coins in an ejecting operation.

29. In a selecting and registering fare box, the combination of a selecting mechanism adapted to select and separate the coins, a delivery slide associated with the inlet of said mechanism, a coin receiver disposed above said delivery slide and comprising an open top longitudinal neck having a plurality of aligned inlet openings, an inclined chute arranged at the lower end of said neck and provided with a transparent view wall, and a hopper arranged at the lower end of said chute and above the delivery slide for the reception of the coins passing down said chute.

30. In a selecting and registering fare box, the combination of a selecting mechanism adapted to select and separate the coins, a plurality of delivery slides associated with the inlet of said mechanism, a coin receiver disposed above said delivery slides and comprising an open top longitudinal neck having a plurality of aligned inlet openings, an inclined chute arranged at the lower end of said neck and provided with a transparent wall, and a plurality of hoppers arranged at the lower end of said chute and above the delivery slides, the said hoppers being adapted to receive the coins and hold the same in a stacked condition in the path of the delivery slides aforesaid, the number of the aforesaid inlet openings exceeding the number of the hoppers.

31. In a selecting and registering fare box, the combination of a supporting frame, a receiving hopper, a delivery slide arranged intermediate of said selecting mechanism and hopper, a reciprocating bar operatively connected to said delivery slide and having upper and lower studs in spaced relation and a rack formation intermediate of said studs, a pawl pivoted on the supporting frame and having upper and lower detents adapted for alternate engagement with the ratchet formation of said reciprocating bar, said pawl having an arm adapted for alternate engagement with the upper and lower studs aforesaid, a yielding means adapted to move and hold the pawl member in its alternate engagement with the upper and lower portions of the rack formation aforesaid, and a resilient buffer associated with one of the aforesaid studs and adapted for initial contact with the arm of the pawl member to retard the operation of the parts.

32. In a selecting and registering fare box, the combination of a supporting frame, a receiving hopper, a delivery slide arranged intermediate of said selecting mechanism and hopper, a reciprocating bar operatively connected to said delivery slide and having upper and lower studs in spaced relation and a rack formation intermediate of said studs, a pawl pivoted on the supporting frame and having upper and lower detents adapted for alternate engagement with the ratchet formation of said reciprocating bar, said pawl having an arm adapted for alternate engagement with the upper and lower studs aforesaid, a yielding means adapted to move and hold the pawl member in its alternate engagement with the upper and lower portions of the rack formation aforesaid, and a resilient buffer associated with upper stud aforesaid, and adapted for initial contact with the arm of the pawl member to retard the operation of the parts and attain a slow reversal of said pawl member in a down stroke of the reciprocating bar.

33. In a selecting and registering fare box, the combination of a supporting frame, a receiving hopper, a selecting mechanism, a delivery slide arranged intermediate of said hopper and selecting mechanism, a track member carried by the supporting frame and forming a guide for said delivery slide, a transversely movable plate forming the portion of said track member beneath the receiving hopper and adapted in its removal to leave a gap in said track member, and a coin receptacle associated with said gap and adapted to receive the contents of the hopper on a retraction of said plate.

34. In a selecting and registering fare box, the combination of a supporting frame, a receiving hopper, a selecting mechanism, a delivery slide arranged intermediate of said hopper and selecting mechanism, a track member carried by the supporting frame and forming a guide for said delivery slide, a transversely movable plate forming the portion of said track member beneath the receiving hopper and adapted in its removal to leave a gap in said track member, a coin receptacle associated with said gap and adapted to receive the contents of the hopper on a retraction of said plate, and a swinging baffle plate arranged in the upper portion of said coin receptacle and adapted to close the entry thereof, when the fare box is tilted.

35. In a selecting and registering fare box, the combination of a supporting frame, a receiving hopper, a selecting mechanism, a delivery slide arranged intermediate of said hopper and selecting mechanism, a track member carried by the supporting frame and forming a guide for said delivery slide, a transversely movable plate forming the portion of said track member beneath the receiving hopper and adapted in its removal to leave a gap in said track member, means for yieldingly holding said plate to its normal position, manual means for moving said plate rearwardly, and a coin receptacle associated with said gap and adapted to receive the contents of the hopper on a retraction of said plate.

36. In a selecting and registering fare box, the combination of a supporting frame, a receiving hopper, a selecting mechanism, a delivery slide arranged intermediate of said hopper and selecting mechanism, a track member carried by the supporting frame and forming a guide for said delivery slide, a transversely movable plate forming the portion of said track member beneath the receiving hopper and adapted in its removal to leave a gap in said track member, means for yieldingly holding said plate to its normal position, manual means for moving said plate rearwardly, a coin receptacle associated with said gap and adapted to receive the contents of the hopper on a retraction of said plate, and a swinging baffle plate arranged in the upper portion of said coin receptacle and adapted to close the entry thereof, when the fare box is tilted.

37. In a selecting and registering fare box, the combination of a supporting frame, a receiving hopper, a selecting mechanism, a delivery slide arranged intermediate of said hopper and selecting mechanism, a removable housing having an open bottom and adapted to cover and enclose the supporting frame and mechanisms of the fare box, a track member carried by the supporting frame and forming a guide for said delivery slide, a transversely movable plate forming the portion of the track member beneath the receiving hopper and adapted in its removal to leave a gap in said track member, manual means for moving said plate rearwardly, the same comprising a lever pivoted on the supporting frame and having connection at one end with said transversely movable plate and at its other end a receiving eye, a sliding rod mounted for transverse movement in the removable enclosing housing aforesaid, and having an operating knob at one end and at the other end, a down turned prong adapted to engage the receiving eye of the lever aforesaid.

38. In a selecting and registering fare box, the combination of a supporting frame, a receiving hopper, a selecting mechanism, a delivery slide arranged intermediate of said hopper and selecting mechanism, a removable housing having an open bottom and adapted to cover and enclose the supporting frame and mechanisms of the fare box, a track member carried by the supporting frame and forming a guide for said delivery slide, a transversely movable plate forming the portion of the track member beneath the receiving hopper and adapted in its removal to leave a gap in said track member, manual means for moving said plate rearwardly, the same comprising a lever pivoted on the supporting frame and having connection at one end with said transversely movable plate and at its other end a receiving eye, a sliding rod mounted for transverse movement in the removable enclosing housing aforesaid, and having an operating knob at one end, and at the other end, a down turned prong adapted to engage the receiving eye of the lever aforesaid, a spring tending to move said rod in a rearward direction, and means for locking said rod in its forward position against the stress of the spring.

39. In a selecting and registering fare box, the combination of a supporting frame, a receiving hopper, a selecting mechanism, a delivery slide arranged intermediate of said hopper and selecting mechanism, a track member carried by the supporting frame and forming a guide for said delivery slide, a transversely movable plate forming the portion of said track member beneath the receiving hopper and adapted in its removal to leave a gap in said track member, a jolting pin mounted for vertical movement in the said movable plate, manual means for imparting reciprocation to said pin, and a coin receptacle associated with the aforesaid gap and adapted to receive the contents of the hopper on a retraction of said plate.

40. In a selecting and registering fare box, the combination of a supporting frame, a receiving hopper, a selecting mechanism, a delivery slide arranged intermediate of said hopper and selecting mechanism, a track member carried by the supporting frame and forming a guide for said delivery slide, a transversely movable plate forming the portion of said track member beneath the receiving hopper and adapted in its removal to leave a gap in said track member, a jolting pin mounted for vertical movement in the said movable plate, a lever pivoted on said movable plate and connected at one end to said jolting pin, a spring for imparting downward movement to said end of the lever, and manual means for imparting downward movement to the opposite end of said lever.

41. In a selecting and registering fare box, the combination of a supporting frame, a receiving hopper, a selecting mechanism, a delivery slide arranged intermediate of said hopper and selecting mechanism, a removable housing having an open bottom and adapted to cover and enclose the supporting frame and mechanisms of the fare box, a track member carried by the supporting frame and forming a guide for said delivery slide, a transversely movable plate forming the portion of the track member beneath the receiving hopper and adapted in its removal to leave a gap in said track member, manual means for moving said plate rearwardly, a jolting pin mounted for vertical movement in the said movable plate, a lever pivoted to said movable plate and connected at one end to said jolting pin, a headed post on the other end of said lever, a vertically moving plunger moving in a guide in the removable housing of the fare box, and having aligned relation with the headed post aforesaid, a spring tending to move said plunger in an upward direction, and a coin receptacle associated with the aforesaid gap and adapted to receive the contents of the hopper on a retraction of the movable plate, aforesaid.

Signed at Chicago, Illinois, this 1st day of March, 1922.

FRANK G. MURRAY.